(No Model.)

J. KIRBY.
CULTIVATOR.

No. 439,014. Patented Oct. 21, 1890.

Witnesses
Sam'l R. Turner
Van Buren Hillyard

Inventor
John Kirby
By his Attorneys
R.S. & A.P. Lacey

UNITED STATES PATENT OFFICE.

JOHN KIRBY, OF MARENGO, IOWA.

CULTIVATOR.

SPECIFICATION forming part of Letters Patent No. 439,014, dated October 21, 1890.

Application filed June 6, 1890. Serial No. 354,440. (No model.)

*To all whom it may concern:*

Be it known that I, JOHN KIRBY, a citizen of the United States, residing at Marengo, in the county of Iowa and State of Iowa, have invented certain new and useful Improvements in Cultivators; and I do hereby declare the following to be a full, clear, and exact description of the invention, such as will enable others skilled in the art to which it appertains to make and use the same.

This invention relates to cultivators, and has for its object to provide a machine for preparing the ground—such as is covered with stubble and cornstalks—to receive small grain, and which will perform its work speedily and in a satisfactory manner.

The improvement consists of the novel feature and peculiar construction and combination of the parts, which will be hereinafter more fully described and claimed, and which will be shown in the accompanying drawings, in which—

Figure 1:
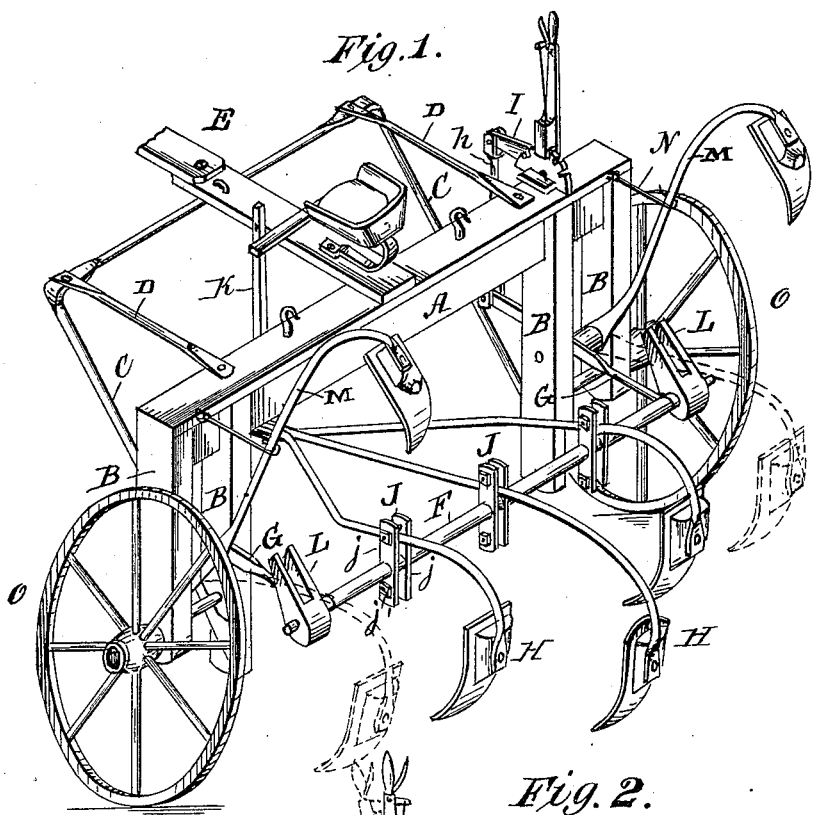
Figure 2:
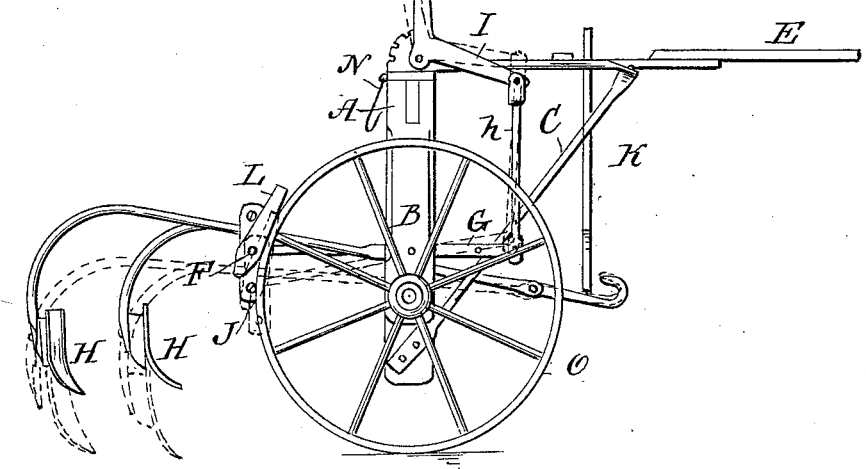

Figure 1 is a perspective view of a machine embodying my invention, showing the end cultivators held out of active position by full lines and in an active position by dotted lines. Fig. 2 is a side view showing the manner of adjusting the gang of cultivators.

The frame of the machine is composed of the beam A, the pendent standards B B at the ends of the beam A, the truss-brace C, having its ends attached to the inner standards B B, and the rods D, connecting the upper end of the truss-brace C with the beam A. The tongue E is secured to the beam A and the truss-brace C, and is adapted to be shifted laterally on the same to adapt the machine to be drawn by one, two, or three horses. The bar F, secured near its ends to the links G, which are pivotally connected with the standards B B, forms a bail or support for the cultivator-gangs H. One of the links is extended forward, and its end is connected with the hand-lever I by the rod *h*. The cultivator-bars H rest on the supporting-bar F, and are held thereon by the clamps J, which are composed of two plates *j j*, apertured at their ends to receive clamp-bolts *j'*, said plates being mounted on the bar F and adapted to receive the said cultivator-bar between them. The draft is applied to the front end of the gang, and to prevent it tilting on the bar F the clevis end of the gang is adapted to engage with the guard K, which is secured at its upper end to the tongue and depends therefrom. The supports L at the ends of the bar F are forked or notched in their upper ends to receive the end cultivator-bars M, which have a pivotal connection at their front ends with the standards B B. These end bars M are adapted to be held up out of the way when not required for use by the hooks or stops N, which are secured to the beam A, as shown by full lines in Fig. 1. The frame is supported on the wheels O, which are mounted on spindles which project laterally from the lower ends of the standards B B.

To adapt the machine for cultivating deep or shallow, the lever I is operated so as to elevate or lower the bar F, thereby raising or lowering the cultivators or shovels, as required.

Having thus described my invention, what I claim, and desire to secure by Letters Patent, is—

1. In a wheel cultivator, the combination of the frame having depending standards at its ends, the bail F G, connected with the said standards and having supports L L at its ends, means for vertically adjusting the said bail, the gang of cultivators supported on the bail, the end cultivator-bars M, pivotally connected with the said standards and adapted to rest in the supports L, and the hooks N, for holding the said bars M up out of the way, substantially as described.

2. A wheel cultivator composed of the frame A B C, the tongue secured to beam A and truss-brace C and adapted to be shifted laterally thereon, the bail F G, having supports L L at its ends, the operating-lever I, having connection with the extended end of the bail, the cultivator-gang supported between its ends on the said bail, the stop K, for limiting the upward movement of the front end of the said gang, the end cultivator-bars M, adapted to rest in the supports L L, and the hooks N, for holding bars M up out of the way, substantially as described.

In testimony whereof I affix my signature in presence of two witnesses.

JOHN KIRBY.

Witnesses:
C. H. DODD,
E. L. MORSE.